United States Patent
Yoo

(10) Patent No.: US 9,579,543 B1
(45) Date of Patent: Feb. 28, 2017

(54) FITNESS-BASED ELECTRONIC DOCUMENT JOB ROUTING TO A SELECTED LOCATION USING A USER'S FITNESS DATA GOAL

(71) Applicants: Kabushiki Kaisha Toshiba, Minato-ku (JP); Toshiba TEC Kabushiki Kaisha, Shinagawa-ku (JP)

(72) Inventor: Won Suk Yoo, Irvine, CA (US)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 0 days.

(21) Appl. No.: 15/010,276

(22) Filed: Jan. 29, 2016

(51) Int. Cl.
 *A63B 24/00* (2006.01)
 *G06F 3/12* (2006.01)
 *H04W 4/00* (2009.01)
 *H04W 4/02* (2009.01)

(52) U.S. Cl.
 CPC .......... *A63B 24/0075* (2013.01); *G06F 3/126* (2013.01); *G06F 3/1291* (2013.01); *H04W 4/003* (2013.01); *H04W 4/023* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 6,542,811 | B2* | 4/2003 | Doi | G01C 21/20 701/429 |
| 8,021,271 | B2* | 9/2011 | Kasama | A63B 24/0062 482/8 |
| 8,090,532 | B2* | 1/2012 | Tashev | G01C 21/3461 340/990 |
| 8,638,229 | B2* | 1/2014 | Downey | A63B 24/0021 340/539.13 |
| 8,793,066 | B2* | 7/2014 | Panabaker | G01C 21/34 701/410 |
| 9,008,967 | B2* | 4/2015 | McBride | G01C 21/20 340/988 |
| 2001/0025222 | A1* | 9/2001 | Bechtolsheim | G01C 21/3423 701/410 |
| 2011/0128824 | A1* | 6/2011 | Downey | A63B 24/0021 368/14 |
| 2012/0109518 | A1* | 5/2012 | Huang | A61B 5/1118 701/433 |
| 2015/0238815 | A1* | 8/2015 | Lee | G01C 21/343 701/533 |

* cited by examiner

*Primary Examiner* — Barbara Reinier
(74) *Attorney, Agent, or Firm* — Ulmer & Berne LLP

(57) ABSTRACT

A system and method for enhancing fitness in an office environment includes receiving fitness goal data corresponding to a targeted fitness goal of at least one user. The user initiates a document processing request to commence processing on a networked document processing device. The user provides data identifying at least one electronic document desired for processing. Data relative to the user's location and the document processing devices is used, along with historical fitness information relative to the user and a user's fitness goal, to generate suggested document processing devices which are distanced so as to afford progress toward those goals.

20 Claims, 7 Drawing Sheets

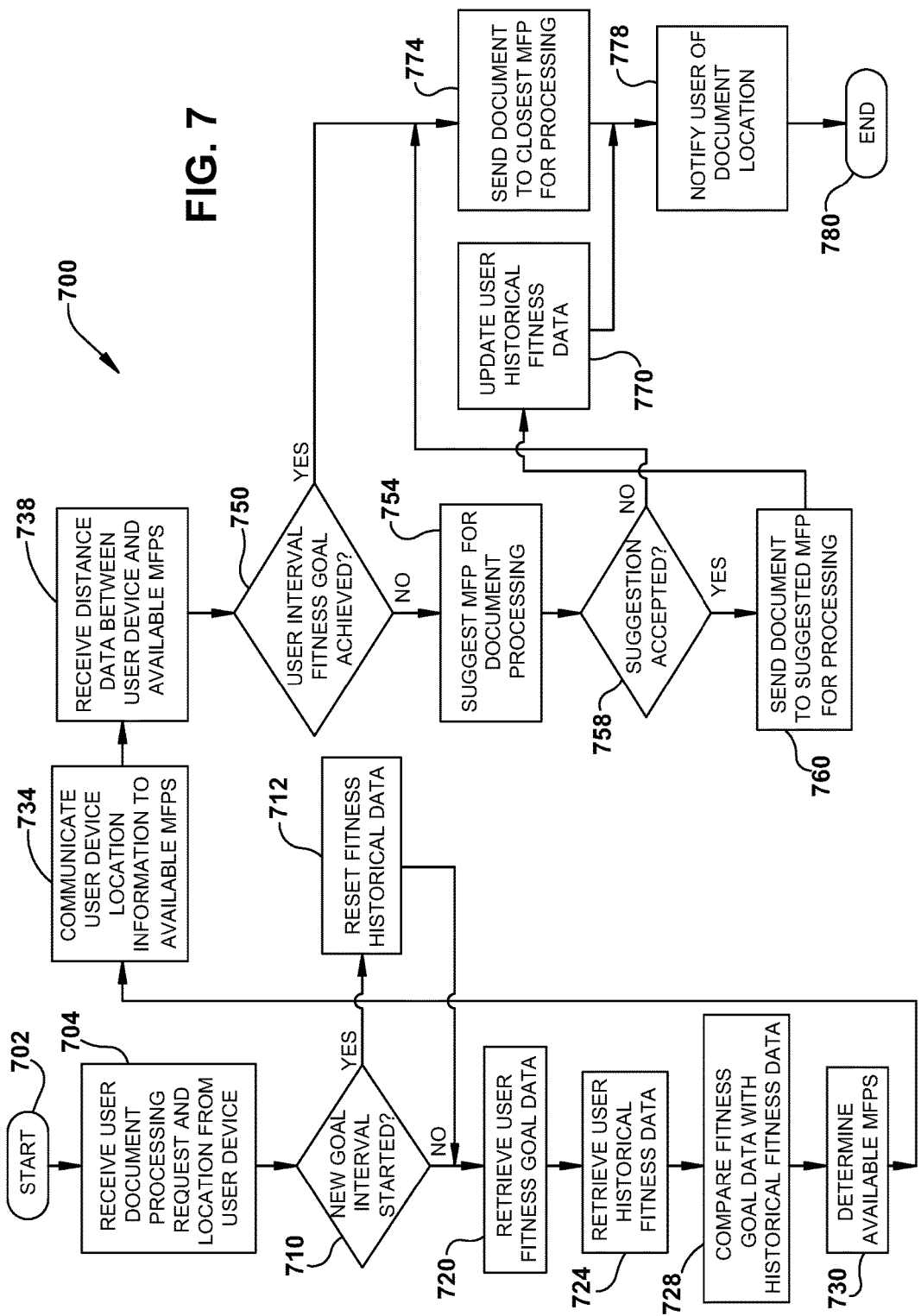

FITNESS-BASED ELECTRONIC DOCUMENT JOB ROUTING TO A SELECTED LOCATION USING A USER'S FITNESS DATA GOAL

TECHNICAL FIELD

This application relates generally to monitoring and promoting physical activity. The application relates more specifically to enhancing health by monitoring and promoting physical activity in an office environment.

BACKGROUND

Continuing advances in technology often leave people with an increasingly sedentary lifestyle. Tasks that once required physical activity have been eliminated, or rendered easier by innovation. By way of example, staircases have been supplemented by escalators and elevators, and walkways have been supplemented by people moving conveyors. As a result, on average, people are becoming increasingly unfit. Average body fat content, particularly in first world countries such as the United States, is creeping upward at an alarming rate. Office workers comprise some of the most sedentary workday lifestyles. Workers may spend hours behind a desk or on a computer as they draft documents, such as briefs, spreadsheets, reports, web pages or software, spend hours on phone calls, and frequently sit during extended meetings or seminars.

While technological advances have lessened physical activity, other advances have provided tools with which people can monitor their activity, calculate energy spent and track activity toward target fitness or weight loss goals. Example products include wearable health monitors, such as the FITBIT products of Fitbit, Inc., GEARWATCH products of Samsung and Garmin VIVOFIT products. Such devices may include tracking systems, using technologies such as GPS, cellular or local area network. They may also include a compass, accelerometer, temperature gauge or other hardware or software systems to facilitate health or exercise monitoring. Applications running on suitably equipped smartphones may also provide the same or similar functionality.

SUMMARY

In accordance with example embodiments of the subject application, a system and method for enhancing fitness includes receiving fitness goal data corresponding to a targeted fitness goal of at least one user. The user initiates a document processing request to commence processing on a networked document processing device. The user provides data identifying at least one electronic document desired for processing. Data relative to the user's location and the document processing devices is used, along with historical fitness information relative to the user and a user's fitness goal, to generate suggested document processing devices which are distanced so as to afford progress toward those goals.

BRIEF DESCRIPTION OF THE DRAWINGS

Various embodiments will become better understood with regard to the following description, appended claims and accompanying drawings wherein:

FIG. 7 is an example embodiment of a flowchart.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with the subject application, increased physical activity is monitored and promoted in business environments while workers go about their normal job routines. Employers are focusing increasingly on employee health. This is not only for the betterment of individual health, but may also include financial incentives. Health insurers may provide better premiums to employees or employers where members achieve certain health or fitness objectives.

Document processing devices include printers, copiers, scanners and e-mail gateways. More recently, devices employing two or more of these functions are found in office environments. These devices are referred to as multifunction peripherals (MFPs) or multifunction devices (MFDs). MFPs are used in connection with example embodiments disclosed in detail below, but it is to be appreciated that any suitable document processing device can be used.

Given the expense in obtaining and maintain MFPs, devices are frequently shared among users via a data network. Users may send document processing jobs, such as a print request, to one or more networked devices. In a typical shared device setting, one or more workstations are connected via a network. When a user wants to print a document, an electronic copy of that document is sent to a document processing device via the network. Electronic documents may be sent from the user's workstation, from a document server, or from any digital device accessible to a common network. The user may select a particular device for document processing when several are available. In many instances, a worker will simply have a default device, such as a default printer, that is more proximate to the worker's office or workstation. That device will be used, subject to an alternative selection being made if a device is offline, out of paper or malfunctioning. Another device may be selected if the default device does not have needed capabilities, such as collating, color rendering, hole-punching or stapling.

Figure 1:
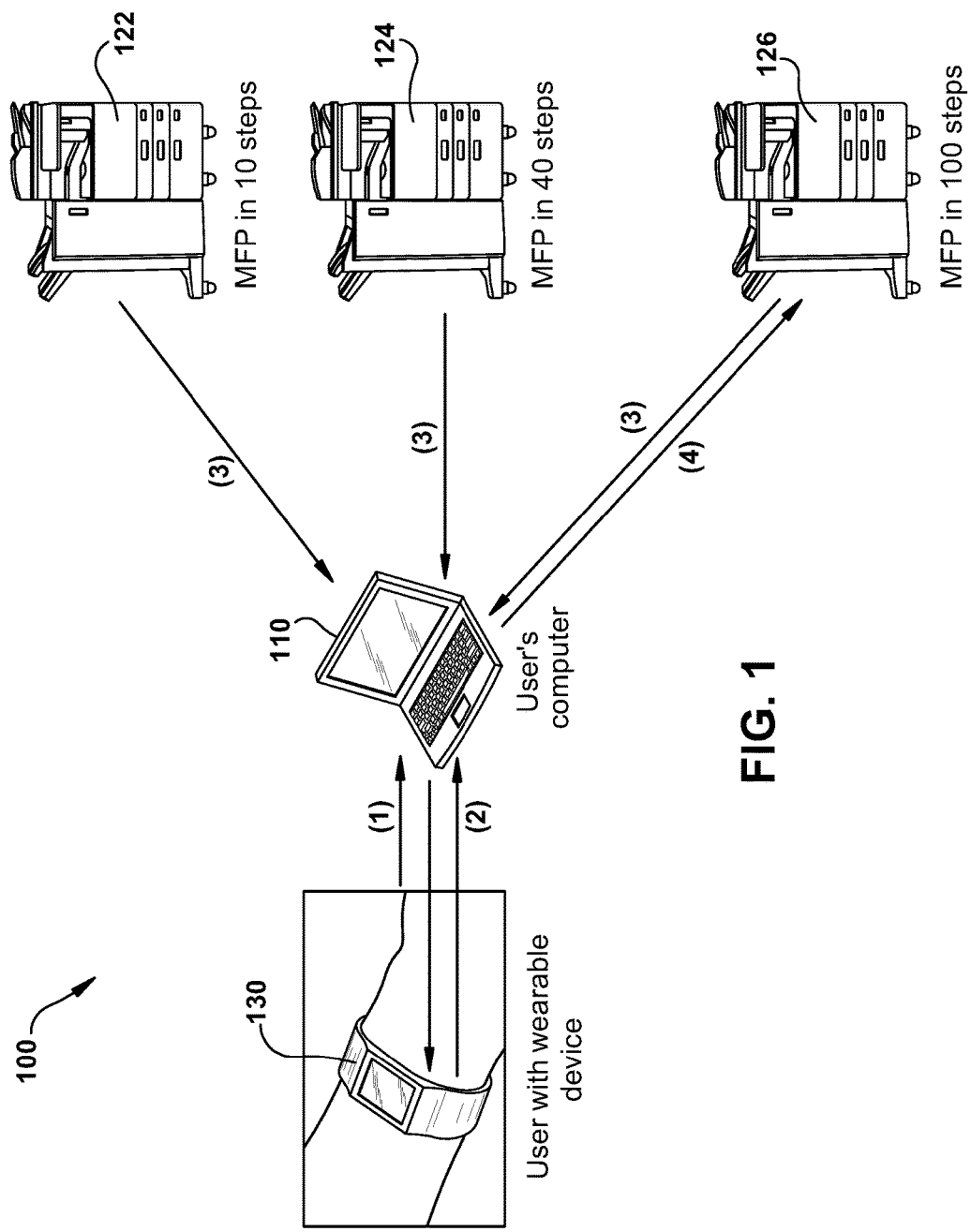
FIG. 1 an example embodiment of a system for promotion of worker fitness in an office environment.

Turning to FIG. 1, illustrated is an example embodiment of a health monitoring and promotion system 100 for promotion of worker fitness in an office environment. In the illustrated example, network computer users suitably interact with their computers, such as workstations, notebook computers, tablets, smartphones, and the like to accomplish document processing tasks using shared network peripherals. User computer 110 is suitably in data communication with multiple document processing devices, such as MFP 122, MFP 124 and MFP 126. Data communication between each user computer 110 and the MFPs 122, 124, 126 is suitably accomplished via any suitable data path, such as data network comprising a local-area network (LAN), a wide-area network (WAN) which may comprise the Internet, or any combination of the same. Alternative data pathways suitably include universal serial bus (USB), Bluetooth, near-field communication (NFC), cellular, or the like, alone or in combination.

User computer 110 suitably provides an interface to accumulate or relay fitness information from one or more users associated with wearable fitness monitors. User fitness information may be input into the user computer 110 directly by an associated user. Fitness information may include information relative to fitness activity or fitness goals of each particular user. Such information is also suitably provided by a wearable device 130 associated with the user, such as wearable fitness monitors detailed above. Data communication with a wearable device 130 is suitably wired, such as via USB, Lightning Connector, near-field communication, optical, such as infrared, Bluetooth, or the like. A wearable device 130 may include information relative to an associated user's fitness history, such as number of steps taken over given period, as well as fitness goals established by the user. It is understood that such information is suitably stored or copied into any suitable data storage, including the user's computer 110 or networked data storage.

In the illustration of FIG. 1, the user computer 110 is in data communication with the MFPs from a static, or known, relative location. In the example, user computer 110 is 10 steps from MFP 122, 40 steps from MFP 124 and 100 steps from MFP 126. Locations of devices such as user computers 110 or MFPs 122, 124, 126 is suitably preset by an administrator. Alternatively, position information is suitably determined by indoor location technology, such as LAN information, signal strength monitoring, or any suitably means or combination as will be understood by one of ordinary skill in the art. Location information is also suitably obtained via GPS tracking, cell sector tracking, radio signal triangulation, or the like, alone or in combination.

In the example of FIG. 1, fitness information provides input to allow for adjustment of document processing device selection to help accomplish such goals. By way of further example, user computer 110 communicates with wearable device 130 to secure fitness goal data (1) relative to user activity targets or goals, as well as user activity data (2) such as monitored or measured user fitness activity. When the user is in need of a document processing operation, such as printing a document, a determination is suitably made as to which devices are suitable candidates for completing the desired job. Determinations as to candidate devices are suitably made in conjunction with one or more factors including device availability, device capability, or a range of acceptable device distances from the user computer 110. Candidate devices suitably report at (3) on availability or provide distance information relative to the user computer 110 to issue the print job.

The user computer 110 suitably calculates, given the user's fitness goals and progress thus far, suggestions for device selection for completing the desired document processing operation. By way of particular example, a user with high fitness goals or limited progress thus far is suitably prompted with suggestions to print at more distant devices. Such suggestions are suitably coupled with an estimation of exercise value by making a particular selection, which is suitably supplemented with the user's particular fitness goals. A user selects from a candidate device, and this selection provides information that can be used to update the user's fitness history. The user's wearable device 130 is then suitably updated accordingly. In the example embodiment of FIG. 1, MFP 126 is suggested as the best candidate for printing given its distance of 100 steps from the user's wearable device 130, and the job is routed at (4) upon approval.

As a further example, there may be instances where third parties, such as an administrator, benefits coordinator or health insurance provider determines a fitness goal for employees, and supplied information is used in providing one or more suggested document processing devices for document processing. Financial or other incentives may be provided to employees who achieve fitness goals. Additional controls may include a minimum distance for job retrieval to enforce a modicum of user activity or a maximum distance to prevent wasting of employee time. Also, a user or administrator may choose to bypass the system entirely, such as when a particular user has physical limitations, such as illness, pregnancy or disabilities.

Figure 2:
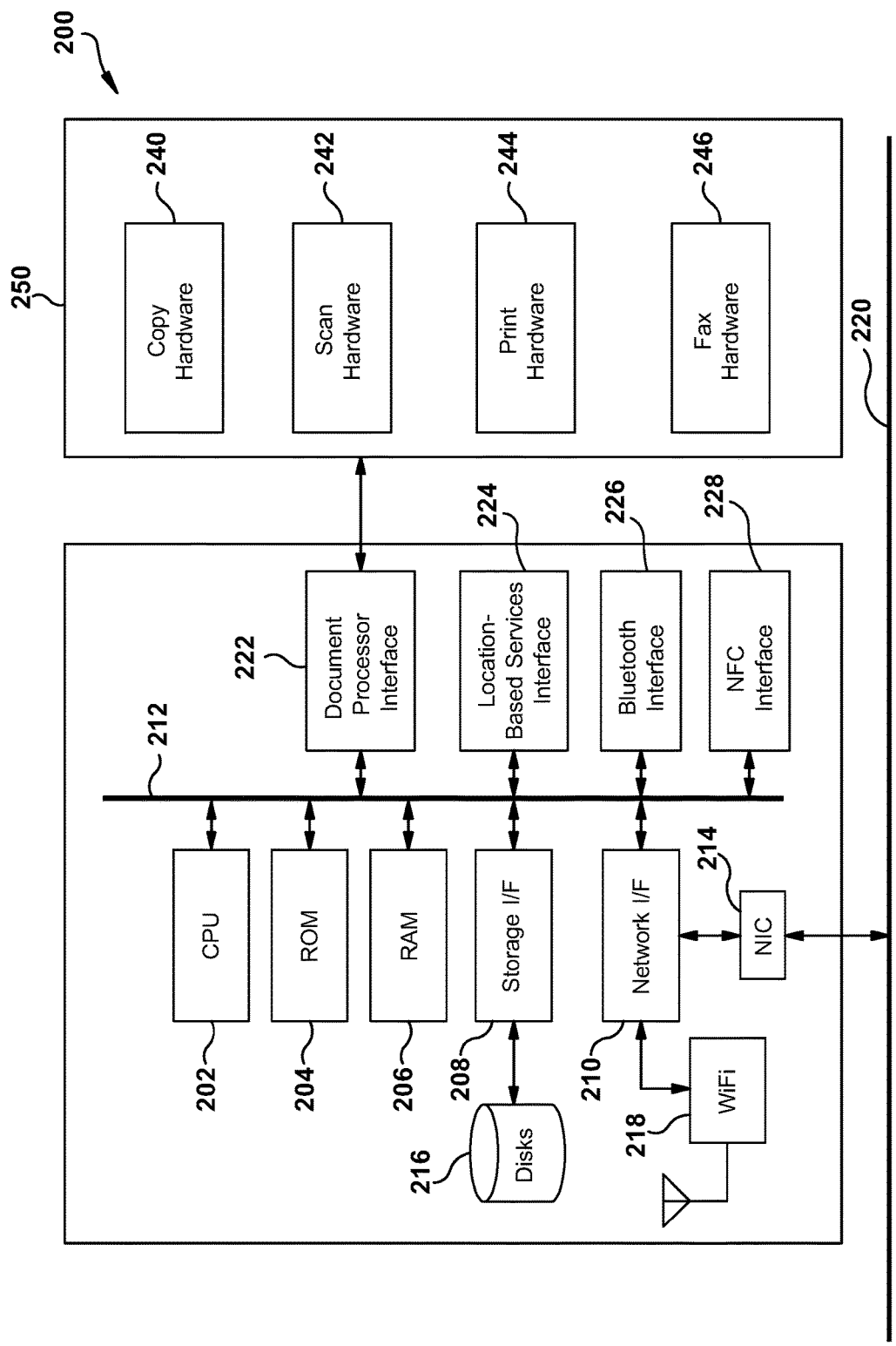
FIG. 2 is an example embodiment of a document processing device, such as a multifunction peripheral.

Turning now to FIG. 2, illustrated is an example of a digital processing system 200 suitably comprised within an MFP, such as MFP 122, 124 or 126. Included are one or more processors, such as that illustrated by CPU 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like. NIC 214 and wireless network interface 218 suitably provide for connection to an associated network 220.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units. Data bus 212 also suitably provides an interface to a location-based services interface 224 suitably for obtaining location information. Data communication directly with wearable devices is suitably accomplished wirelessly, such as via Bluetooth interface 226 or near-field communication interface 228. In a configuration, the Bluetooth interface 226 or near-field communication interface 228 can be connected via network interface 210.

In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
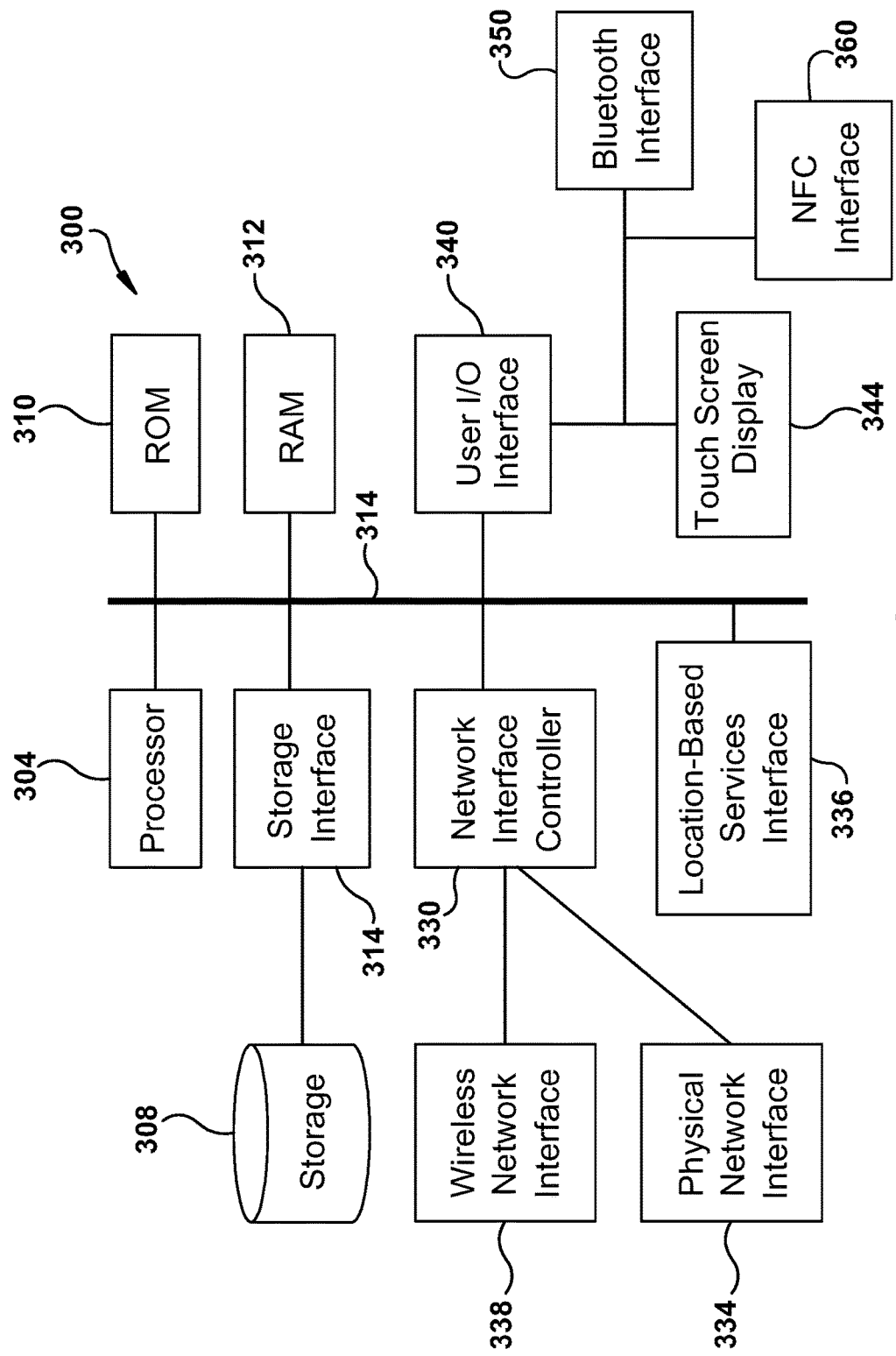
FIG. 3 is an example embodiment of a user device.

Turning now to FIG. 3, illustrated is an example of a digital processing system 300 suitably comprised within the user device 110 of FIG. 1. Included are one or more processors, such as that illustrated by processor 304. Each processor is suitably associated with non-volatile memory, such as bulk storage 308 and ROM 310, as well as random access memory (RAM) 312, via a data bus 314. Storage is suitably local to the device, but can also be remote storage via a networked storage location or via cloud storage.

Processor 304 is also in data communication with a storage interface 314 for reading or writing to a data storage system 112, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, cellular or the like. A location based services module 336 is also suitably in data communication with bus 314 and stores or determines a physical location of a user device.

In the illustration of FIG. 3, also in data communication with bus 314 is a user input/output interface 340 which suitably provides a gateway to any suitable peripheral or device, such as touch screen display 344, Bluetooth interface 350 or near-field communication interface 360.

Figure 4:
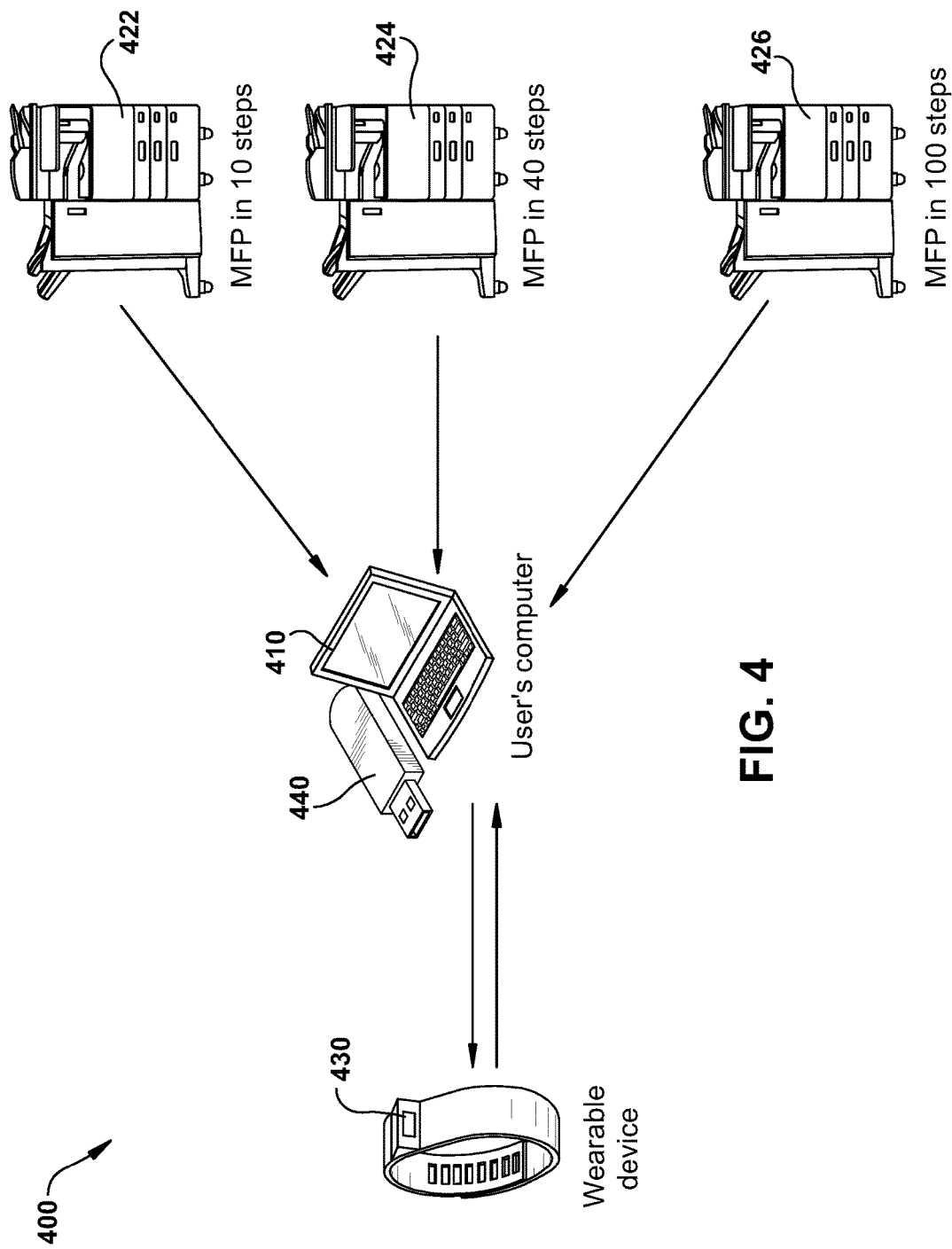
FIG. 4 is an example embodiment of a system for promotion of worker fitness in an office environment

Turning next to FIG. 4, illustrated is another example embodiment of a system 400 for promotion of worker fitness in an office environment. In the example embodiment, user computer 410 is in data communication with the MFPs from a static or known, relative location. In the example, user computer 410 is 10 steps from MFP 422, 40 steps from MFP 424 and 100 steps from MFP 426. Locations of devices such as user computers 410 or MFPs 422, 424, 426 is suitably preset by an administrator or determined by location technology such as that detailed above.

In the example of FIG. 4, fitness information provides input to allow for adjustment of document processing device selection to help accomplish such goals such as illustrated above. By way of further example, user computer 410 communicates with wearable device 430 to secure fitness data, suitably comprising goal data relative to user activity targets or goals, as well as user activity data such as monitored or measured user fitness activity and is resident at the user device 410. It is to be understood that health information is suitably stored in any data storage, which may include a networked server, another data device or on an MFP controller. Fitness data is advantageously communicated securely, and is alternatively communicated via a hardware path such as via a USB memory device 440. When the user is in need of a document processing operation, such as printing a document, a determination is suitably made as to which devices are suitable candidates for completing the desired job. Determinations as to candidate devices are suitably made in conjunction with one or more factors including device availability, device capability, or a range of acceptable device distances from the user computer 410. Candidate devices suitably report on availability or provide distance information relative to the user computer 410 to issue the print job.

As with FIG. 1, above, user computer 410 suitably calculates, given the user's fitness goals and progress thus far, suggestions for device selection for completing the desired document processing operation. A user selects from a candidate device, and this selection provides information that can be used to update the user's fitness history. The user's wearable device 430 is then suitably updated accordingly.

Figure 5:
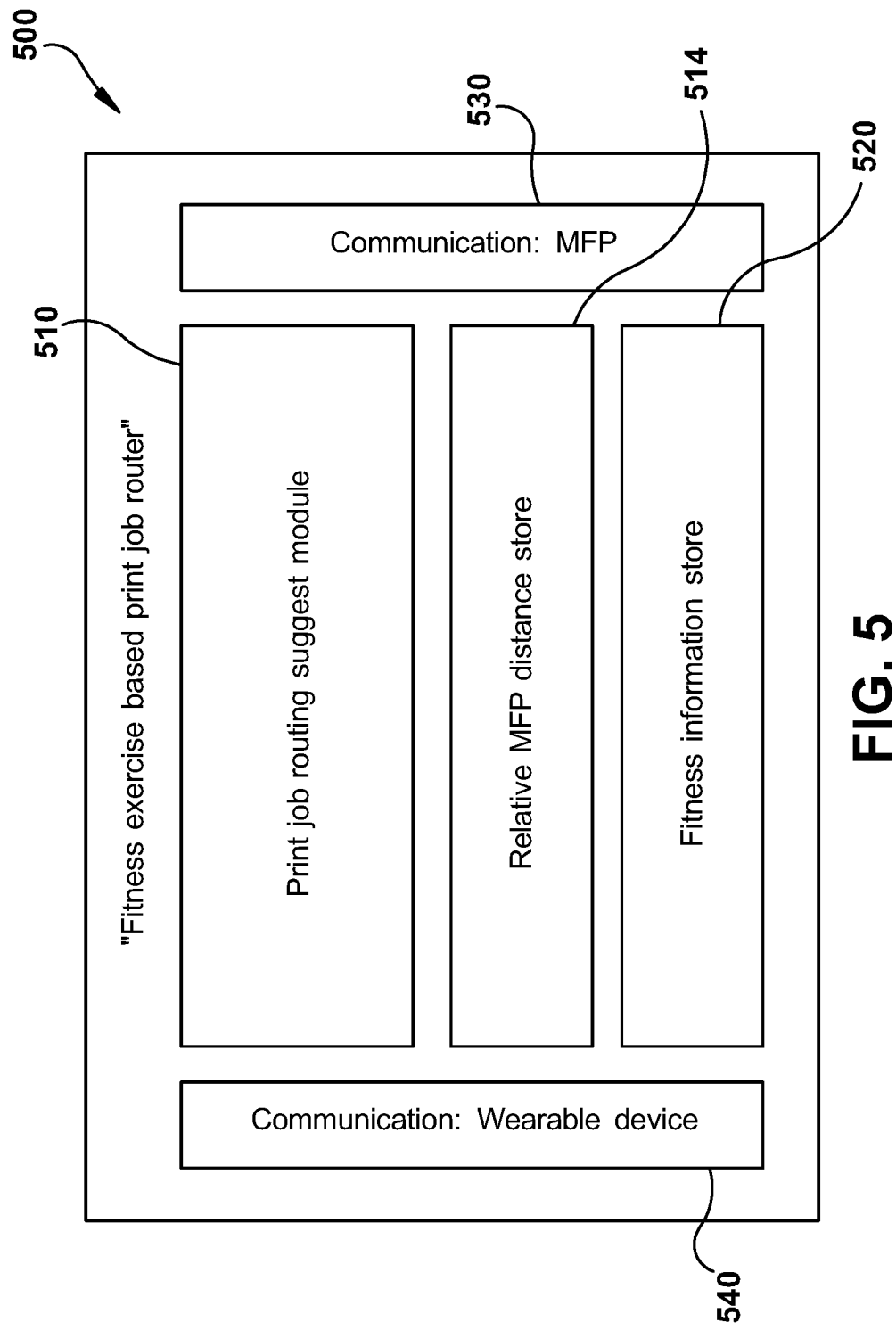
FIG. 5 is an example embodiment of a software module block diagram.

Referring now to FIG. 5, illustrated is an example embodiment of software module block diagram to realize example embodiments described herein. An example flowchart suitably implemented with software modules 500 will be detailed below. Realization is suitably accomplished in hardware such as that illustrated with FIG. 2 or FIG. 3. Included is a print job routing suggest module 510, a relative MFP distance store 514, a fitness information store 520, a MFP communication module 530 and a wearable device communication module 540.

Figure 6:
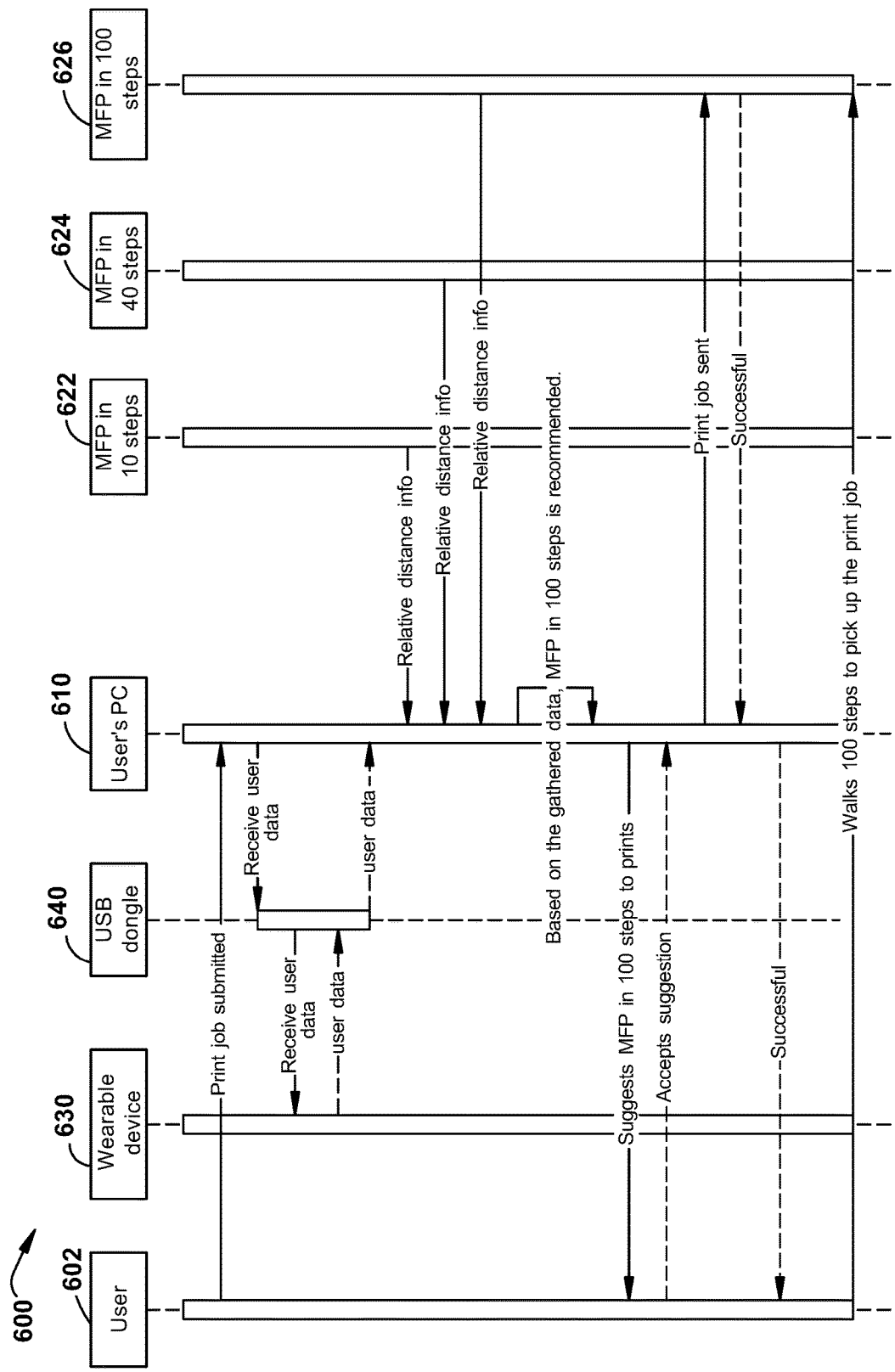
FIG. 6 is an example embodiment of data or instruction flow.

Turning now to FIG. 6, illustrated is an example embodiment of data or instruction flow 600 in connection with the forgoing. User 602 is suitably associated with user PC 610. Available MFPs for job processing include MFP 622, MFP 624 and MFP 626. User 602 is also suitably associated with wearable device 630 and USB dongle 640.

Referring now to FIG. 7, illustrated is a flowchart 700 of an example embodiment of the subject application. The process suitably commences at block 702, and proceeds to block 704 where a user submits a document processing request, suitably via an associated user device. It will be appreciated that such a request may be initiated via any suitable device, such as to with another user's device or with an MFP. Next, a determination is made at block 710 as to whether a new goal interval associated with the submitting user has been commenced. If so, the user's historical fitness data, particularly relative to the instant interval, is suitably reset at block 712 and progress is made to block 720 wherein a fitness goal associated with the user is retrieved. In the event that no new interval is started as determine by block 710, progress is made immediately to block 720.

Next, historical fitness data associated with the user is retrieved at 724. This value may have been reset at block 712. Next, a comparison between a user's fitness goal data and historical fitness data is made at block 728, and available MFPs are determined at block 730. A user's location is communicated to the MFPs at block 734, and the MFPs respond so as to allow for a determination of relative distance to the user at block 738. A determination is made as whether the user's fitness goal was achieved at block 750. If not, a suggestion for a document processing device is made at block 754. If the user accepts the suggestion at block 758, the document is sent to the approved device at block 760, and the user's historical fitness data is updated at block 770. If the user does not accept the suggestion at block 758, the document processing job is suitably sent to the MFP closest to the user at block 774 for processing. Progress is made from either block 770 or block 774 to block 778 wherein the user is suitably notified of a location for document retrieval, and the process suitably ends at block 780.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
an input operable to receive fitness goal data corresponding to a targeted fitness goal of at least one associated user, the input operable to receive document processing request data including document data identifying at least one electronic document, the document processing request data corresponding to at least one document processing operation request from the at least one associated user associatively with user location data corresponding to a user location of the at least one user;
a network interface operable for data communication relative to a plurality of associated document processing devices, the network interface operable for receiving device location data corresponding to a location of each of the plurality of document processing devices for processing of the at least one electronic document in accordance with the document processing request data;
a processor and associated memory configured to calculate fitness option data corresponding to movement of the user from the user location to the location of each of the plurality of document processing devices in accordance with the user location data and the device location data, the processor configured to generate proposed device selection data in accordance with the fitness goal data and the fitness option data; and
an output operable to communicate the proposed device selection data to a data device associated with the at least one associated user.

2. The system of claim 1 wherein the input is operable to receive device selection data from the at least one associated user responsive to the proposed device selection data, and
wherein the network interface is operable to output instructions to communicate the at least one electronic document to at least one of the plurality of document processing devices in accordance with received device selection data.

3. The system of claim 2 wherein the processor configured to calculate fitness progress data in accordance with an estimation of energy required for the user to move between the user location and at least one of the plurality of document processing devices in accordance with the fitness option data and the device selection data.

4. The system of claim 3 wherein the input is operable to receive fitness goal data is further operable to receive the fitness goal data via a wireless data link with a wearable device secured to the at least one user.

5. The system of claim 3 wherein the processor is further configured to store historic fitness data comprising the fitness progress data, and
wherein the processor is further configured to generate updated, proposed device selection data in accordance with previously stored historic fitness data.

6. The system of claim 5 wherein the processor is further configured to generate the updated, proposed device selection data in accordance with data corresponding to a preselected fitness goal duration.

7. The system of claim 2 wherein the processor is further configured to calculate the fitness option data in accordance with step count data received from the wearable device.

8. A method comprising:
receiving fitness goal data corresponding to a targeted fitness goal of at least one associated user;
communicating data, via an associated network, with a plurality of associated document processing devices;
receiving document processing request data including document data identifying at least one electronic document, the document processing request data corresponding to at least one document processing operation request from the at least one associated user associatively with user location data corresponding to a user location of the at least one user;
receiving, via the associated network, device location data corresponding to a location of each of the plurality of document processing devices for processing of the at least one electronic document in accordance with the document processing request data;
calculating, via a processor and associated memory, fitness option data corresponding to movement of the user from the user location to the location of each of the plurality of document processing devices in accordance with the user location data and the device location data;
generating, via the processor, proposed device selection data in accordance with the fitness goal data and the fitness option data; and
communicating the proposed device selection data to a data device associated with the at least one associated user.

9. The method of claim 8 further comprising:
receiving device selection data from the at least one associated user responsive to the proposed device selection data; and
outputting instructions to communicate the at least one electronic document to at least one of the plurality of document processing devices in accordance with received device selection data.

10. The method of claim 9 further comprising:
calculating fitness progress data in accordance with an estimation of energy required for the user to move between the user location and at least one of the plurality of document processing devices in accordance with the fitness option data and the device selection data.

11. The method of claim 10 further comprising:
receiving the fitness goal data via a wireless data link with a wearable device secured to the at least one user.

12. The method of claim 10 further comprising:
storing historic fitness data comprising the fitness progress data; and
generating updated, proposed device selection data in accordance with previously stored historic fitness data.

13. The method of claim 12 further comprising:
generating the updated, proposed device selection data in accordance with data corresponding to a preselected fitness goal duration.

14. The method of claim 9 further comprising:
calculating the fitness option data in accordance with step count data received from the wearable device.

15. A system comprising:
a data interface configured to communicate data with a portable digital device carried by the user;
a processor and associated memory, the memory configured to store fitness data received from the portable digital device via the data interface;
an input configured to receive a document processing request from the user, the document processing request including document data corresponding to at least one electronic document, the input configured to receive location data corresponding to a location of the user;

a network interface configured for data communication with a plurality of multifunction peripherals, the network interface configured to communicate the fitness data to at least one of the multifunction peripherals, the network interface configured to receive candidate device data responsive to the fitness data, the candidate device data identifying at least one candidate multifunction peripheral for processing of the at least one electronic document; and an output configured to communicate the candidate device data to the user;

wherein the input is further configured to receive selection data from the user responsive to the candidate device data, wherein the network interface is further configured to communicate the selection data to the at least one multifunction peripheral, and wherein the network interface is further configured to commence a document processing operation on a multifunction peripheral specified by the selection data.

16. The system of claim 15 wherein the fitness data is comprised of user-specified fitness goal data.

17. The system of claim 15 wherein the fitness data is comprised of measured user activity.

18. The system of claim 15 wherein the document data includes a print file.

19. The system of claim 15 wherein the location data is comprised of GPS data.

20. The system of claim 15 wherein the network interface is further configured for receiving updated fitness data responsive to the selection data, and wherein the data interface configured to communicate the updated fitness data to the portable digital device.

* * * * *